United States Patent [19]
Kornylo et al.

[11] Patent Number: 5,683,796
[45] Date of Patent: Nov. 4, 1997

[54] SPRAY URETHANE METHOD OF MAKING A HEADLINER ASSEMBLY

[75] Inventors: Walter P. Kornylo, Livonia; Kelly M. Houf, Fenton; Janusz P. Gorowicz, Pinckney, all of Mich.

[73] Assignee: Atoma International Inc., Newmarket, Canada

[21] Appl. No.: 539,407

[22] Filed: Oct. 5, 1995

[51] Int. Cl.$^6$ .................. B32B 3/26; B32B 7/00
[52] U.S. Cl. ............... 428/304.4; 156/78; 264/46.4; 264/46.6; 428/269
[58] Field of Search ............... 264/46.4, 46.7, 264/46.5, 46.6, 309; 156/66, 78, 245; 428/90, 95, 91, 186, 247, 269, 304.4, 309.9; 296/214

[56] References Cited

U.S. PATENT DOCUMENTS

| | | | |
|---|---|---|---|
| 4,052,241 | 10/1977 | Walter | 156/245 |
| 4,256,797 | 3/1981 | Stamper et al. | 428/215 |
| 4,443,286 | 4/1984 | Ikeda et al. | 156/245 |
| 4,810,316 | 3/1989 | Wakabayashi et al. | 156/78 |
| 4,871,612 | 10/1989 | Okina et al. | 428/269 |
| 4,881,997 | 11/1989 | Hatch | 156/66 |
| 5,026,586 | 6/1991 | Tabor | 428/90 |
| 5,112,542 | 5/1992 | Beer | 264/46.7 |
| 5,132,063 | 7/1992 | Hughes | 264/46.4 |
| 5,273,698 | 12/1993 | Thary | 264/46.4 |
| 5,389,317 | 2/1995 | Grimmer | 264/46.5 |

*Primary Examiner*—Helen Lee
*Attorney, Agent, or Firm*—Cushman Darby & Cushman IP Group of Pillsbury Madison & Sutro LLP

[57] ABSTRACT

A headliner assembly for lining a passenger compartment ceiling of a motor vehicle comprising a headliner cover having an exterior surface presenting a major exterior appearance of the headliner assembly and an opposite interior surface, and a body of foamed material adhered to the opposite interior surface of the headliner cover and having central portions thereof with a greater thickness than peripheral portions thereof, the body of foamed material being of generally constant density throughout its extent including the central and peripheral portions thereof.

7 Claims, 5 Drawing Sheets

SPRAY URETHANE METHOD OF MAKING A HEADLINER ASSEMBLY

This invention relates to a headliner assembly for a motor vehicle and a method of manufacturing the same.

Motor vehicle headliner assemblies are also known as motor vehicle ceiling liners and are used to line the ceiling or underside of the roof of a motor vehicle. The headliner assembly typically comprises a fabric or vinyl outer layer that presents the major exterior appearance of the vehicle ceiling, a soft, flexible foam intermediate layer of a relatively thin configuration, a layer of imperforate urethane film laminate disposed on a surface of the soft foam intermediate layer opposite the outer layer, and a thick, rigid polyurethane foam layer formed on the imperforate film as the innermost layer of the headliner assembly.

In conventional practice, the innermost polyurethane layer is formed from a preformed slab of polyurethane foam of uniform thickness. The slab is attached to the layer of imperforate urethane film laminate, either by suitable adhesive or by curing the slab together with the film laminate in a die-mold. The slab is cured and pressed in the mold to shape the entire combination of layers into the configuration desirable for the headliner assembly. The slab that is utilized is either one of two thicknesses. More specifically, in some instances, a relatively thin thickness is used which is generally equal to the thickness that is desired and essential to the periphery of the headliner for securing the periphery to the ceiling of the vehicle body, for example, by appropriate trim molding. This construction presents a most favorable weight and materials saving characteristic in that this thin amount of material that is used on the periphery is also used in the center. This configuration, however, suffers from the disadvantage that the center portion is relatively thin and does not present a desirable acoustical effect for the headliner assembly. In other instances, a much thicker slab is used that provides a much more desirable acoustic effect in the center of the headliner. However, because the periphery of the headliner cannot be this thick, the slab must be compressed along the periphery to enable it to be secured to the ceiling of the vehicle body. This means that the periphery has much more material than is desired or than is presented in the instance in which a thinner slab is used.

In effect, each of the prior art headliners of different thicknesses suffers from different disadvantages. That is, where a thin foam slab is used so that a desirable material quantity is expended, the acoustic characteristics suffers. On the other hand, where a thick foam slab is used so as to provide desirable acoustic characteristics, an excessive amount of material needs to be used along the periphery of the headliner assembly.

It is thus an object of the present invention to provide a method of manufacturing a headliner assembly that obtains the advantages of both prior art arrangements while eliminating the disadvantage. This object is achieved by providing a method for forming a motor vehicle headliner assembly having peripheral portions with a relatively smaller thickness than central portions comprising the steps of providing a headliner cover having an exterior surface which is to present the major exterior appearance of the headliner assembly and an opposite interior surface; mounting the headliner cover on a vacuum mold so that the exterior surface is facing a shaping mold surface of the vacuum mold having a shape corresponding with the desired major exterior surface shape of the headliner cover and so that the interior surface is facing away from the mold surface; applying a vacuum to the vacuum mold so as to draw the exterior surface of the headliner cover into conformity with the shaping mold surface of the vacuum mold; providing a foamable material directly to different areas on the opposite surface of the headliner cover such that a greater amount of foamable material per unit area will generally be applied to central portions of the opposite surface of the headliner cover relative to the amount of foamable material per unit area applied to peripheral portions of the opposite surface of the headliner cover, the foamable material being applied to the different areas in amounts generally commensurate with a desired thickness of the headliner assembly at the different areas; expanding the foamable material at a generally constant rate throughout so that the foamable material has a generally constant density throughout; and curing the foamable material and adhering the foamable material to the headliner cover so as to provide a body of foamed material constituting an inner layer of the headliner assembly.

It is also an object of the present invention to provide a headliner assembly which has superior acoustical characteristics while utilizing less foam material than what is possible in convention techniques. In accordance with this object, the present invention provides a headliner assembly for lining a passenger compartment ceiling of a motor vehicle comprising a headliner cover having an exterior surface presenting a major exterior appearance of the headliner assembly and an opposite interior surface, and a body of foamed material adhered to the opposite interior surface of the headliner cover and having central portions thereof with a greater thickness than peripheral portions thereof, the body of foamed material being of generally constant density throughout its extent including the central and peripheral portions thereof.

The technology utilized in accordance with the present invention is to be contrasted with the somewhat similar foam-in-place technology utilized in forming seat cushions. For example, in U.S. Pat. No. 5,273,698 there is disclosed a molding method for a seat in which the volume of the foamable material placed in the mold is concentrated in a relatively thick volume as distinguished from the spread-out thin volume that applies to the headliner assembly of the present invention. Consequently, in the thicker volume situation, it is possible to vent the mold, and the foamable material is placed in the mold by a flowable nozzle rather than by a spray nozzle. After the thick foamable material is placed in the lower mold, the upper mold is closed almost immediately, and there are venting provisions in the upper mold which will allow the foamable material to free-rise while in the mold and to be subsequently cured. This cannot be done when manufacturing a headliner assembly because of the need to discharge the gases which are created over such a vast surface area. Consequently, the conventional techniques for manufacturing a headliner assembly do not foam-in-place but rather utilize the slab technique.

In the present invention, by spraying the foamable material over the entire surface of the laminate which receives the foamable material and by allowing the foamable material to free-rise before it is closed into the mold, the problems associated with discharging gases is avoided. The problem with gas discharge is further avoided in the present invention by providing a headliner cover which comprises a decorative layer having a surface constituting a major exterior appearance of the headliner assembly and an opposite surface, a first layer of polyurethane foam adhered to the opposite surface of a decorative layer, an imperforate film barrier adhered to a first layer of polyurethane foam on a side of a first layer of polyurethane foam opposite a decorative layer, and a second layer of polyurethane foam adhered to an imperforate film barrier on a side of said imperforate film barrier opposite a first layer of polyurethane foam.

These and other objects, features, and advantages of the present invention will become apparent from the following description and the appended claims, taken in conjunction with the accompanying drawings.

DETAILED DESCRIPTION OF THE DRAWINGS

Figure 1:
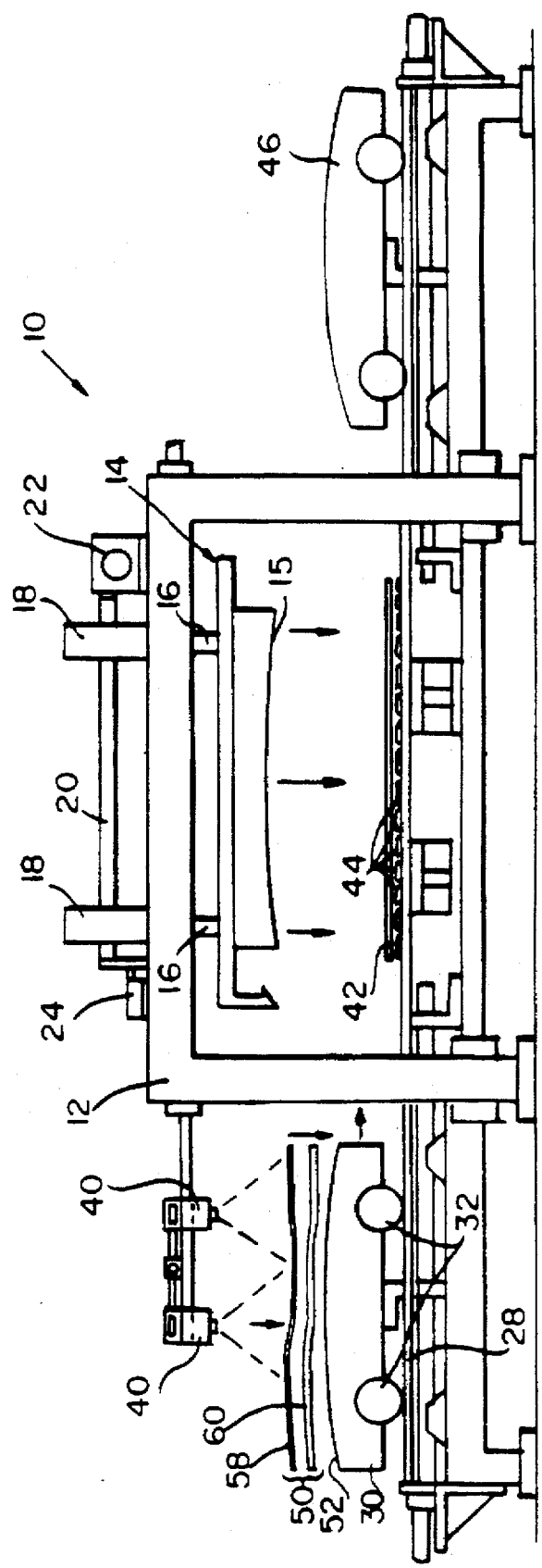
FIG. 1 is a schematic side view showing a molding apparatus utilized in manufacturing the headliner assembly in accordance with the principles of the present invention.

FIG. 1 is a schematic side view showing a molding apparatus 10 utilized in manufacturing the headliner assembly in accordance with the principles of the present invention. The molding apparatus 10 comprises a steel frame 12, which mounts an upper mold assembly 14 for vertical movement. The upper mold assembly 14 has a lower mold surface 15, which is shaped in conformance with the desired uppermost configuration for the headliner assembly. The vertical movement of the upper mold assembly 14 can be accomplished in any conventional fashion. In the present embodiment, the upper mold assembly is provided with a plurality of rack columns 16, which cooperate with the plurality of pinion drivers contained within pinion housings 18. The pinions are driven by a servo drive rod 20, which is rotated by a motor 22. A fixed encoder 24 is capable of determining the relative position of the upper mold assembly 14 at all times.

The mold apparatus 10 further includes a fixed track 28, which extends through frame 12, beneath the upper mold assembly 14. A lower mold assembly 30 is mounted for movement on track 12 by bearing or wheel members 32. The lower mold assembly 30 is driven along track 28 in any suitable fashion. In FIG. 1, the lower mold assembly 30 is shown in its start position. The molding apparatus 10 can optionally be provided with a second lower mold assembly 46. The first lower mold assembly 30 and second lower mold assembly 46 can be alternately moved under the upper mold assembly 14 to cooperate therewith during a molding operation. In such fashion, the lower mold assembly not being used can be set up for the next molding operation. Mounted on the frame 12 above the lower mold assembly 30 in the start position is a pair of spray heads 40 mounted for transverse movement with respect to the lower mold assembly 30 and track 28. These spray heads 40 are connected with a source of foamable material such as foamable polyurethane liquid. Plural spray heads 40 are provided in order to reduce the amount of time required to apply the foamable material during the manufacturing process.

Disposed beneath the upper mold assembly 14 is a steel platen 42, which rests upon a plurality of tubular airbags 44 extending transversely with respect to track 28. In FIG. 1, the airbags 44 are shown in a deflated condition.

In FIG. 1, the first step of the molding operation in accordance with the present invention is shown. More specifically, a headliner cover 50 is placed over and laid to rest upon a mold surface 52 of the lower mold assembly 30. The cover 50 comprises a fiberglass mat 58 and a separate cloth member 60. The fiberglass mat 58 is placed upon the cloth member 60 after the cloth member is placed on mold surface 52. The positioning of the fiberglass mat 58 and cloth member 60 is preferably done manually, but the present invention contemplates that an automated placement of this headliner cover can be accomplished. After placement of the headliner cover 50 on the mold surface 52, a vacuum is applied by the lower mold assembly 30 so as to draw the bottom surface of the headliner cover 50 into conformity with the mold surface 52.

Figure 2:
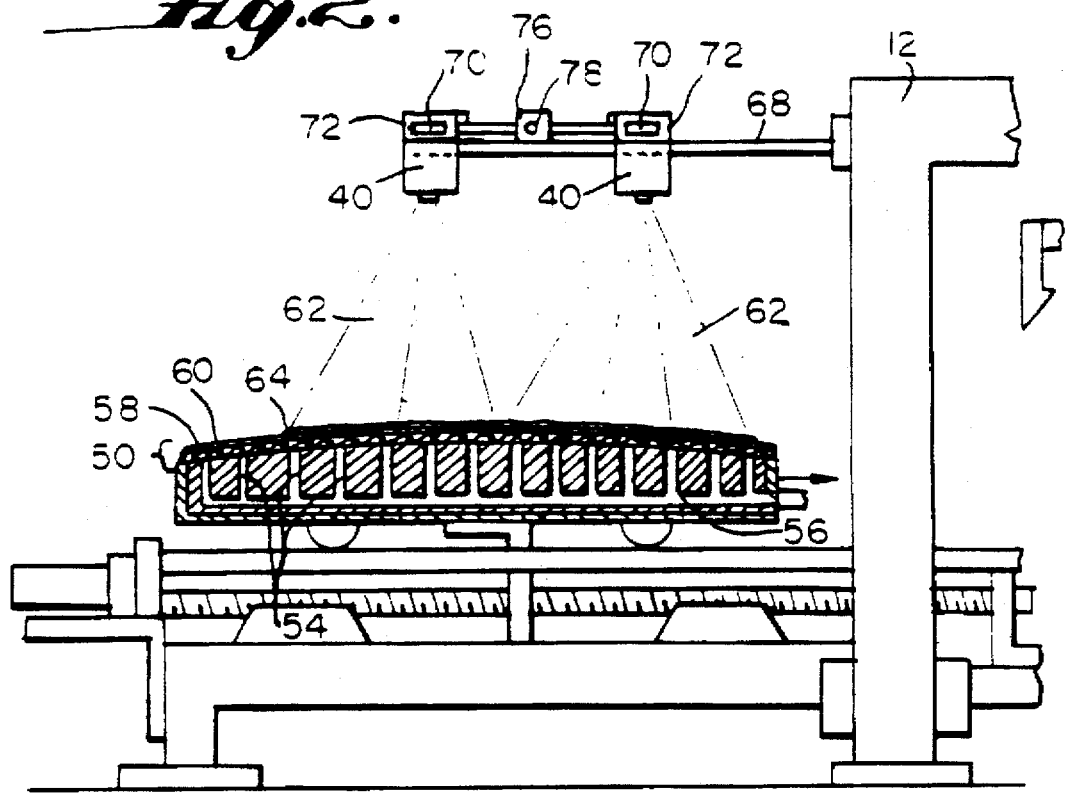
FIG. 2 is a partial schematic side view, partly in section, showing the start position of the molding apparatus utilized in manufacturing the headliner assembly in accordance with the principles of the present invention.

In FIG. 2, it is shown that the lower mold assembly 30 contains a plurality of vacuum ports 54 extending therethrough to the mold surface 52, and a common vacuum channel 56 connecting such vacuum ports 54 with a vacuum system (not shown). It can be appreciated that the fiberglass mat 58 can be applied over the cloth member 60 either before or after the vacuum is applied via vacuum ports 54 to the bottom surface of the headliner cover 50. In the preferred embodiment, the vacuum is applied to the cloth member 60 before the fiberglass mat 58 is placed thereover.

Turning now to FIG. 2, the next step of the method in accordance with the principles of the present invention is shown. More specifically, it can be seen that spray heads 40 apply a spray of foamable material, preferably in the form of a polyurethane foam spray 62 to form a polyurethane foam layer 64 on the headliner cover 50. Preferably, the polyurethane spray 62 is applied with a diameter of approximately 18 inches as it is sprayed upon the fiberglass mat 58 of the headliner cover 50. As indicated by the single arrow in FIG. 2, the lower mold assembly 30 is translated along track 28 as the polyurethane spray 62 is being applied.

Figure 3:
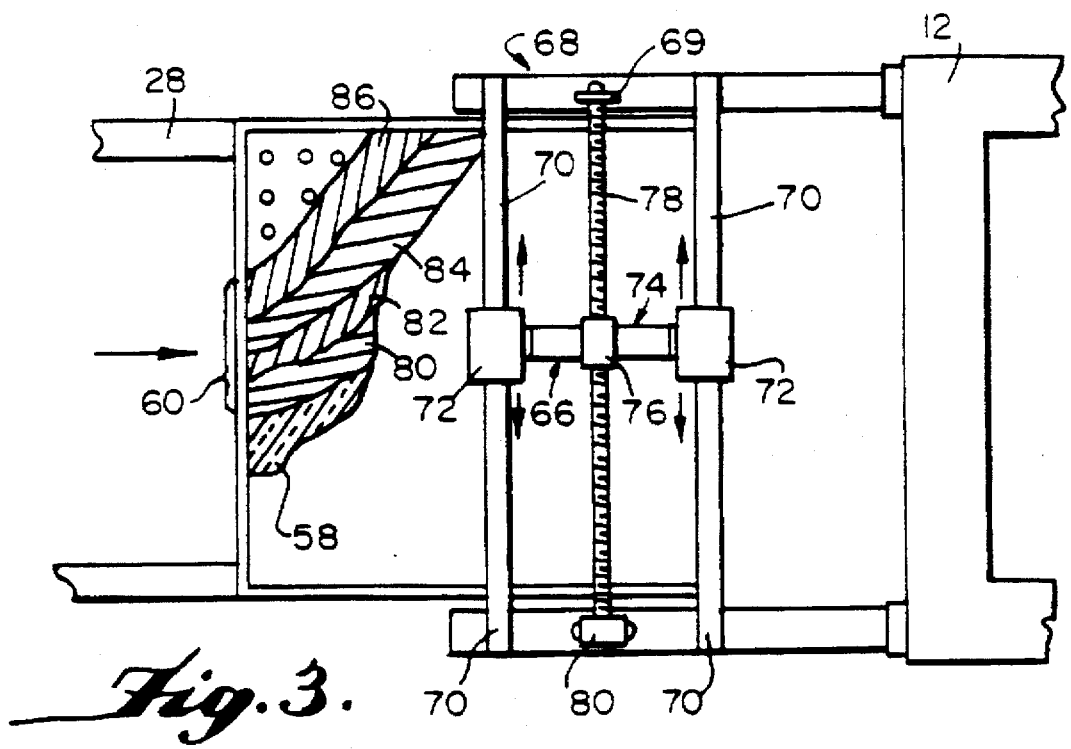
FIG. 3 is an overhead schematic view of the portion of the molding apparatus shown in FIG. 2.

As shown in FIG. 3, the spray heads 40 are fixed on a mounting assembly 66, which is mounted for movement on a track assembly 68 fixed to frame 12 and suspended above the lower mold assembly 30. The track assembly 68 suspends the spray head mounting assembly 66 above the lower mold assembly 30 in the instance in which the mold assembly 30 is in the start position as seen in FIG. 1. The track assembly 68 includes a pair of parallel track members 70 extending in transverse, substantially perpendicular relation with respect to the track 28 therebeneath. A pair of spray head mounting members 72, which form part of carriage assembly 66, are each slidably mounted on a respective track member 70, for example, by an appropriate bearing arrangement. The carriage assembly 66 further includes a connecting assembly 74, which connects the mounting members 72 to one another, and which includes a nut element 76. The nut element 76 has internal threads which cooperate with external threads of a screw member 78 mounted for rotation on the track assembly 68 and extending in parallel relation between track members 70. The screw member 78 is turned at one end by bi-directional electric motor 80 to effect transverse movement of the carriage assembly on track assembly 68. The opposite end of the screw member 78 is mounted in a bearing 69 or equivalent structure.

The bi-directional motor 80 is adapted to alternately rotate the screw mechanism 78 in opposite directions to effectuate back and forth movement of the carriage assembly 66 along the track assembly 68. The direction and speed of electric motor 80 is a function of electrical signals input thereto by a computer (not shown). The computer controls the electrical input to the motor 80 in accordance with the desired foaming thickness of the headliner assembly at different locations. Basically, because the central portions of the headliner are to be made thicker than peripheral portions, the motor 80 moves the carriage assembly slower as the spray heads 40 traverse the center of the headliner assembly than when the carriage reaches the peripheral portions so that more foam will be applied to the center of the headliner assembly than at the periphery.

In the preferred embodiment, the amount of polyurethane spray 62 and the longitudinal speed of the lower mold assembly 30 are constant during application of the polyurethane spray 62, while the speed of the spray heads 40 is controlled. It can be appreciated, however, that a contemplated modification of the present invention is to provide a carriage assembly 66 that moves back and forth at a constant speed, while the amount of polyurethane spray ejected by heads 40 and/or the speed and direction of the lower mold assembly 30 are computer controlled in accordance with the desired thickness of foam to be applied. The sole requirement for providing the foamable polyurethane spray 62 is that it is applied directly to different areas on the headliner cover such that a greater amount of foamable material per unit area will be generally applied to central portions of the headliner cover relative to the amount of foamable material per unit area applied to the peripheral portions of the headliner cover, and that the foamable polyurethane spray 62 be applied to areas of the headliner cover 50 in amounts generally commensurate with the desired thickness of the headliner assembly at such areas.

Figure 4:
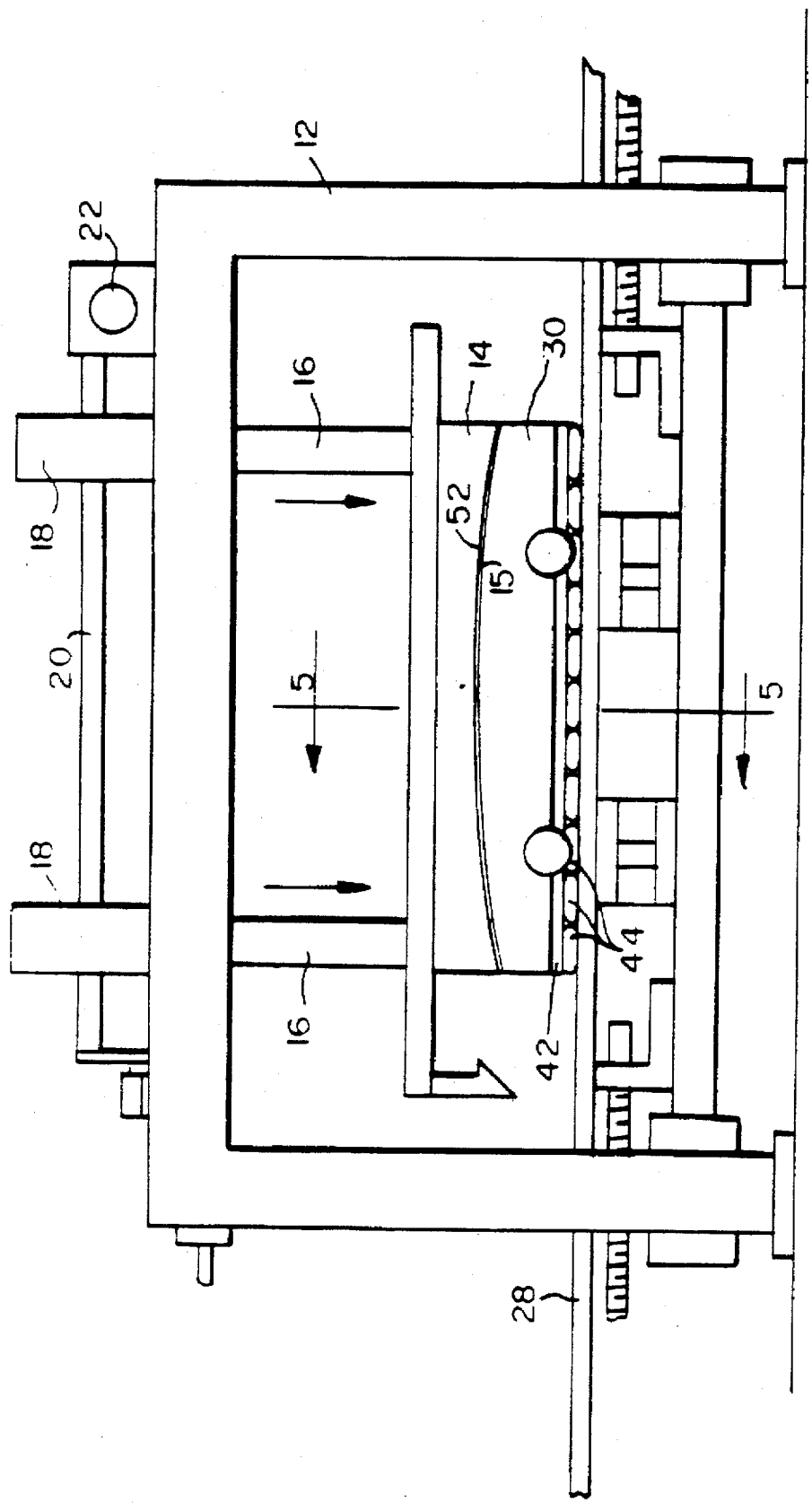
FIG. 4 is a schematic side view showing the molding apparatus of the present invention with the upper and lower mold assemblies disposed in cooperating relation for molding a headliner assembly.

After the appropriate amount of polyurethane spray 62 is provided to form polyurethane foam layer 64, the polyurethane foam layer 64 is permitted to free-rise, without being confined within a mold, and expand at a generally constant rate throughout so that the foamable material has a generally constant density throughout. The lower mold assembly 30 will then continue its movement along track 28 until it is disposed beneath the upper mold assembly 14 and above the platen 42. At this time, as shown in FIG. 4, the upper mold assembly 14 will be lowered upon actuation of motor 22 until mold surface 15 comes to rest upon the polyurethane foam layer 64.

Figure 5:
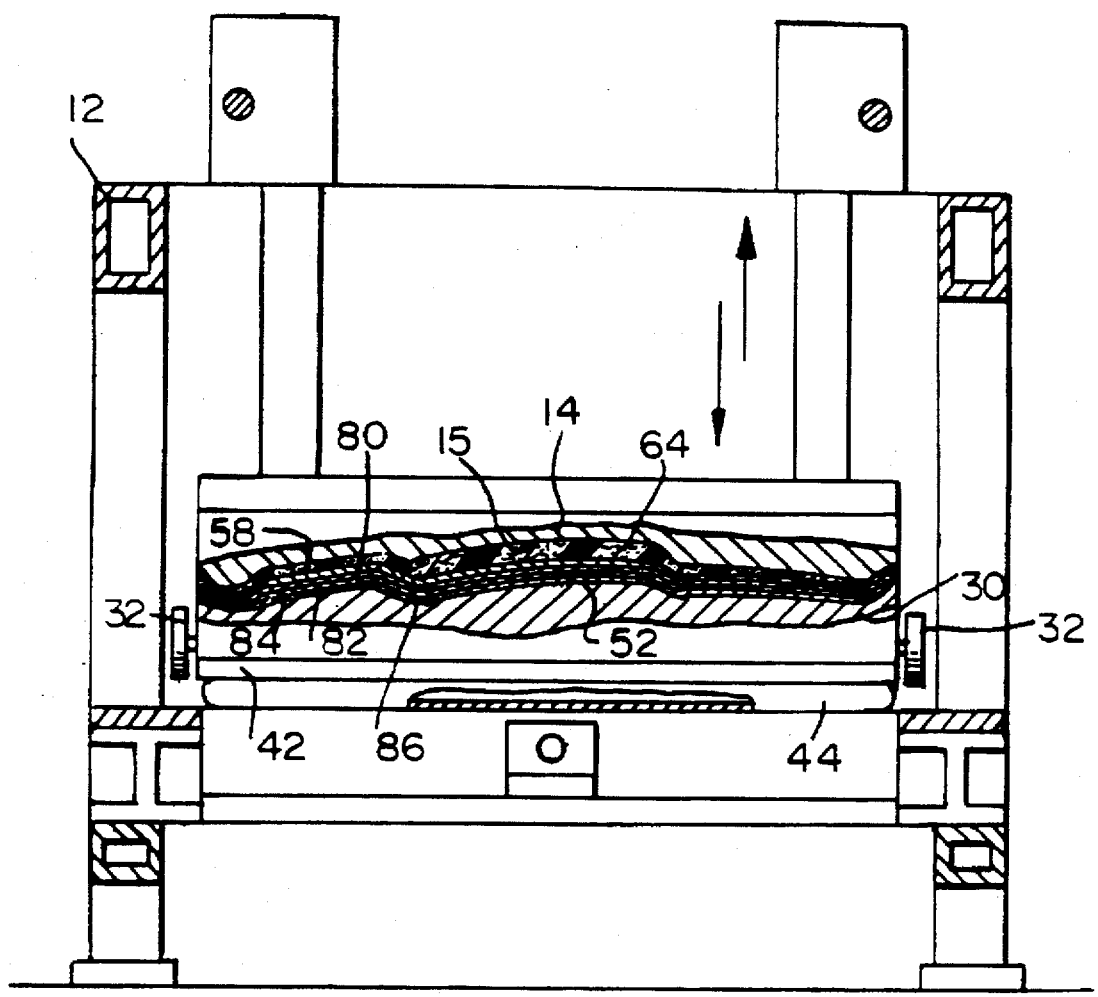
FIG. 5 is a transverse sectional view taken through the line 5—5 in FIG. 4 of the molding apparatus in accordance with the present invention.
Figure 7:
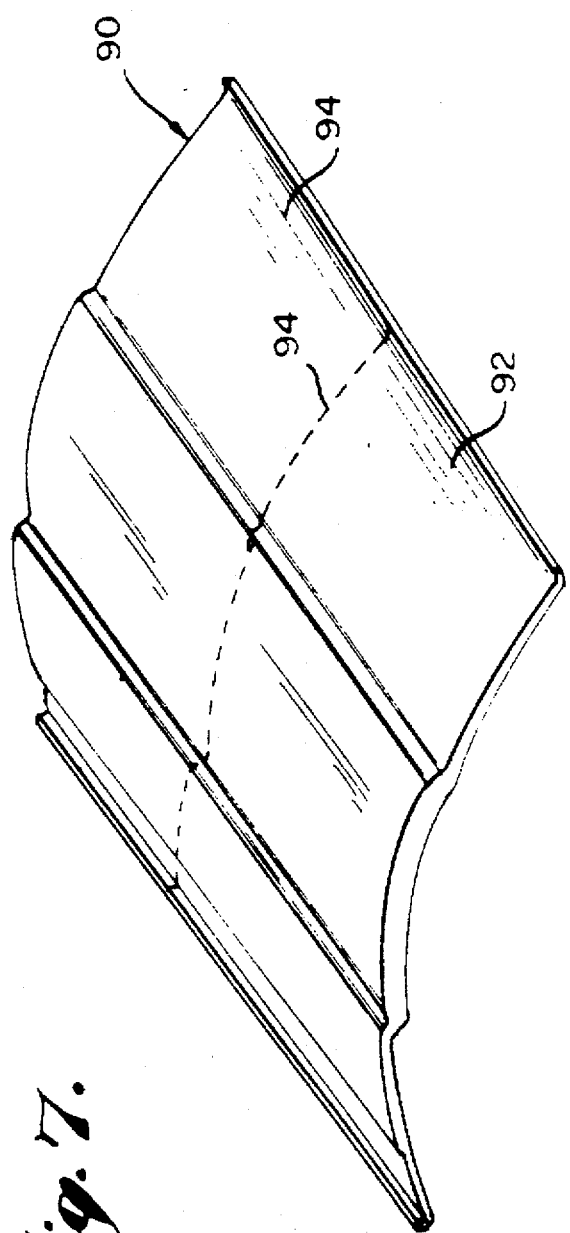
FIG. 7 is a perspective view of a headliner construction comprising two headliner assemblies manufactured in accordance with the principles of the present invention.

Subsequently, the airbags 44 are pressurized to lift platen 42 evenly. The platen engages the underside of the lower mold assembly 30 and lifts it upwardly with respect to the track 28 so that the headliner assembly will be compressed and shaped between mold surfaces 15 and 52 as the foamable material cures at the appropriate temperature and pressure. As shown in FIG. 5, the mold surfaces 15 and 52 have a shape conforming to the desired shape of the finished headliner assembly, as depicted in FIG. 7. During this curing process, the fiberglass mat 58 is adhered by virtue of the foam material to the headliner cloth member 60. Thus, the entire headliner assembly is integrally formed. During the curing of the foamable material, the foamable material is permitted to expand evenly throughout so that the cured foam layer will have a constant density throughout.

After the curing process, the upper mold assembly 14 is raised and airbags 44 are deflated so that the lower mold assembly 30 returns to the track 28. The lower mold assembly 30 will then be moved back to its starting position, and the headliner assembly can be removed from the mold surface 52.

Figure 6:
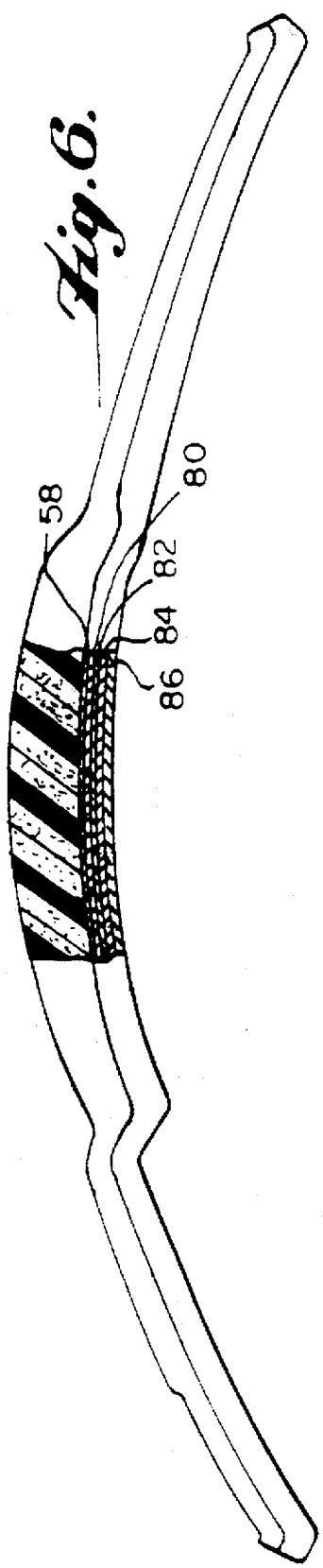
FIG. 6 is a partial sectional view taken through the thickness of the headliner assembly, and showing the different layers of the headliner assembly in accordance with the principles of the present invention.

As can be appreciated from FIGS. 3, 5, and 6, the headliner cover 50 preferably comprises five different layers of material. In the broadest aspects of the invention, however, the headliner cover 50 can be formed from any number of layers (as few as one), so long as it presents an exterior surface that can be used to form major exterior appearance of the headliner assembly.

The upper most layer of the headliner cover 50 comprises the aforementioned fiberglass mat 58. The fiberglass mat 58 is provided as the uppermost layer of the headliner cover and provides rigidity and strength to the entire completed headliner assembly. By changing the percentage of fiberglass mat to foam, it is possible to alter the strength, hardness, and/or density of the assembly. This can also be done by changing the water content of the polyurethane spray 62. As a result, the entire assembly can be an engineered composite relative to part requirements.

Additionally, it can be appreciated from the figures that the headliner cloth member 60 comprises four layers, including, in order from the uppermost layer to the lowermost layer, an upper, thin layer of polyurethane foam 80, a polyethylene film barrier 82, an intermediate layer of polyurethane foam 84, and a decorative material layer 86 such as fabric or vinyl. The purpose and function of each of these layers will now be described.

The decorative layer 86 provides the exterior surface which can be seen from the interior of the vehicle, and is most preferably made from a perforate fabric or cloth that is soft to the touch. The polyurethane foam layer 84 is relatively thin and pliant, and provides the main cushioning for the headliner cloth member 60. The polyethylene film barrier 82 is substantially imperforate, and thus prevents passage of air through the headliner cloth member 60 when the vacuum is applied thereto after it is laid upon mold surface 52. In addition, the film barrier 82 has a great affinity for polyurethane foam so that the foam layers thereabove and therebelow adhere readily thereto. The uppermost layer of the headliner cloth member 60 comprises a thin, pliant polyurethane foam layer 80. The main purpose of this layer is to advantageously reduce air bubbles which may form in the polyurethane foam layer 64 during expansion thereof. More specifically, after the polyurethane spray 62 is applied, the polyurethane foam layer 64 gives off reaction gases as a by-product of the expansion process. These gases have a tendency to form bubbles in the polyurethane foam layer 64, especially in the thicker areas. To reduce the amount of air bubbles created, the polyurethane foam layer 80 is provided to function as a sponge-like material, which permits gases to be absorbed through the fiberglass mat layer 58 and dissipated within layer 80. Thus, the amount of air bubbles is greatly reduced, and a smooth upper surface is formed.

Shown in FIG. 7 is a completed headliner construction 90. It can be appreciated that this assembly 90 actually constitutes a pair of front headliner assemblies 92. More specifically, a vehicle ceiling headliner preferably comprises a front headliner assembly, which is generally disposed over the driver and passenger seats and extends partially rearwardly into the vehicle. The vehicle headliner also includes a separate rear headliner assembly, which is typically twice the size of the front headliner, and extends throughout the rest of the vehicle ceiling. Separate headliner assemblies are provided for ease of installation into the vehicle. In FIG. 7, two front headliner assemblies 92 are shown. These headliner assemblies are formed in the same molding operation, and are subsequently cut along score line 94. It can thus be appreciated that two or more headliner assemblies can be manufactured in a single molding operation for economies of manufacture.

It thus will be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. A method for forming a motor vehicle headliner assembly having central portions and peripheral portions disposed at a periphery of the central portions, said peripheral portions having a thickness that is smaller than a thickness of the central portions, comprising the steps of:

providing a headliner cover having an exterior surface which is to present a major exterior appearance of the headliner assembly and an opposite interior surface;

mounting the headliner cover on a vacuum mold so that the exterior surface is facing a shaping mold surface of the vacuum mold having a shape corresponding with a desired major exterior surface shape of the headliner cover and so that the interior surface is facing away from the mold surface;

applying a vacuum to the vacuum mold so as to draw the exterior surface of the headliner cover into conformity with the shaping mold surface of the vacuum mold;

providing a foamable material directly to different areas on the opposite surface of said headliner cover such that a greater amount of foamable material per unit area will be applied to central portions of the opposite surface of said headliner cover relative to the amount of foamable material per unit area applied to peripheral portions of the opposite surface of said headliner cover, said foamable material being applied to said different areas in amounts commensurate with a desired thickness of the headliner assembly at said different areas;

expanding the foamable material at a generally constant rate throughout so that said foamable material has a generally constant density throughout; and curing the foamable material and adhering the foamable material to the headliner cover so as to provide a body of foamed material constituting an inner layer of said headliner assembly.

2. A method according to claim 1, wherein said headliner cover comprises a perforate material presenting the exterior surface which is to form the major exterior appearance of the headliner assembly, and an imperforate film disposed on a side of said perforate material opposite said surface forming the major exterior appearance of the headliner assembly, and wherein during the step of applying the vacuum to the vacuum mold the imperforate film prevents passage of air through the headliner cover.

3. A method according to claim 2, wherein the headliner cover further comprises a fiberglass material forming the opposite interior surface of said headliner cover upon which said foamable material is provided to, and wherein said mounting of the headliner cover includes first mounting the perforate material and imperforate film adhered thereto as a unit on the vacuum mold, and then mounting said fiberglass material over the perforate material and imperforate film before said foamable material is provided in said providing step.

4. A method according to claim 3, wherein said step of providing the foamable material is accomplished by moving a foam applicator assembly across the opposite interior surface of said headliner cover while said foam applicator assembly sprays the foamable material directly onto the different areas on the opposite interior surface in amounts commensurate with the desired thickness of the headliner assembly at said different areas.

5. A method according to claim 4, wherein the vacuum mold comprises a horizontally movable lower mold portion providing the shaping mold surface and a vertically movable upper mold portion providing a cooperating mold surface, said method further comprising the steps of moving the lower mold portion horizontally in a direction transverse to the direction in which said foam applicator assembly moves across the opposite interior surface of the headliner cover while said foam applicator assembly sprays the foamable material onto the opposite interior surface of the headliner cover, and vertically moving the upper mold portion into cooperative relation with said lower mold portion so that said shaping mold surface of the lower mold portion and the cooperating mold surface apply pressure to the headliner cover and foamable material disposed between said mold surfaces so as to form the headliner assembly into a shape defined by said mold surfaces.

6. A method according to claim 1, wherein said step of providing the foamable material is accomplished by moving a foam applicator assembly across the opposite interior surface of said headliner cover while said foam applicator assembly sprays the foamable material directly onto the different areas on the opposite interior surface in amounts commensurate with the desired thickness of the headliner assembly at said different areas.

7. A method according to claim 6, wherein the vacuum mold comprises a horizontally movable lower mold portion providing the shaping mold surface and a vertically movable upper mold portion providing a cooperating mold surface, said method further comprising the steps of moving the lower mold portion horizontally in a direction transverse to the direction in which said foam applicator assembly moves across the opposite interior surface of the headliner cover while said foam applicator assembly sprays the foamable material onto the opposite interior surface of the headliner cover, and vertically moving the upper mold portion into cooperative relation with said lower mold portion so that said shaping mold surface of the lower mold portion and the cooperating mold surface apply pressure to the headliner cover and foamable material disposed between said mold surfaces so as to form the headliner assembly into a shape defined by said mold surfaces.

* * * * *